March 31, 1964 G. A. JALLEN 3,127,523

BISTABLE HOLDING CIRCUIT HAVING AN "AND" CIRCUIT COUPLING

Filed May 14, 1959

INVENTOR
GALE A. JALLEN

BY Cushman, Darby & Cushman

ATTORNEYS 3,127,523

BISTABLE HOLDING CIRCUIT HAVING AN "AND" CIRCUIT COUPLING

Gale A. Jallen, St. Paul, Minn., assignor to Sperry Rand Corporation, New York, N.Y., a corporation of Delaware Filed May 14, 1959, Ser. No. 813,255
16 Claims. (Cl. 307—88.5)

This invention relates to a bistable circuit, and more specifically to a bistable circuit which changes stable conduction states in response to a signal applied to the cross coupling between its active elements and stays in the new conduction state after the signal has subsided.

Such a circuit has many practical uses. One such use is in computer systems for providing a visual indication of information emanating from a computer in pulse form, and retaining the indication after the information pulse has subsided.

Present day systems have been developed which utilize electronic computers to perform many clerical tasks. Among such systems, for example, are those which maintain up-to-date business inventories, airline and railroad reservation status, etc. Basically, and briefly, these systems operate in a manner that, as a transaction occurs, the pertinent data is fed from an external station into the computer in the form of electrical impulses. The computer determines whether or not there is an impediment to the transaction. If not, it so indicates by transmitting electrical impulses back to the station and at the same time stores the data which had been fed into it, and uses this data to up-date its records. The computer then awaits the next transaction query. If there is an impediment, information as to what the obstacle is, is sent to the external station in the form of electrical impulses. The computer generally operates in conjunction with a multiplicity of remote external stations and means must be provided for distinguishing as to which station is active at any particular time.

Since the data sent to the computer and the responses therefrom are in the form of electrical impulses, a means must be provided to convert these impulses to some form which is recognizable by a human operator. One way, for example, is to activate an indicator light or a series of such lights in effect by such impulses via a bistable circuit constructed in accordance with this invention. Such a circuit is highly useful in providing the visual indications desired for the input-output device described and claimed in the copending application of Fritze et al., Serial No. 729,122, filed April 17, 1958, now Patent No. 3,071,753.

Although, in the preferred embodiment, this invention is used to convert an information pulse into a visual indication, it is to be understood that this invention is not limited thereto.

It is therefore an object of this invention to provide an improved bistable circuit.

Another object of this invention is to provide in a bistable circuit, which has two active elements and biasing means for providing one of the active elements with an operating voltage, means connected to the biasing means for directly removing the operating voltage from the one active element.

A further object of this invention is to provide in a bistable circuit, which has two active elements and biasing means for providing one of the active elements with an operating voltage, gating means, means responsive to at least one signal, connected to the biasing means for directly removing the operating voltage from the one active element.

A further object of this invention is to provide a novel bistable circuit which transforms electrical impulses into visual information.

A further object of this invention is to provide a bistable circuit having a convenient, inexpensive, and reliable circuit checking facility.

Other objects and advantages of this invention will become obvious to those having ordinary skill in the art by reference to the following detailed description of exemplary embodiments of the apparatus and the appended claims.

In brief, the above objects are accomplished by a bistable circuit having two active elements which are cross coupled one to another each by a single path to cause the circuit to exhibit two stable states of operation. One of the single cross coupling paths forms part of a current path for providing one of the active elements with an operating voltage which maintains it in a conducting state. Means responsive to at least one signal, is connected to the one single cross coupling path, to block the current flowing through the above-mentioned current path during the existance of the signal, thereby causing the one active element to become non-conducting and the other active element to become conducting.

The various features of the exemplary embodiments may best be understood with reference to the following drawings, wherein.

Figure 1:
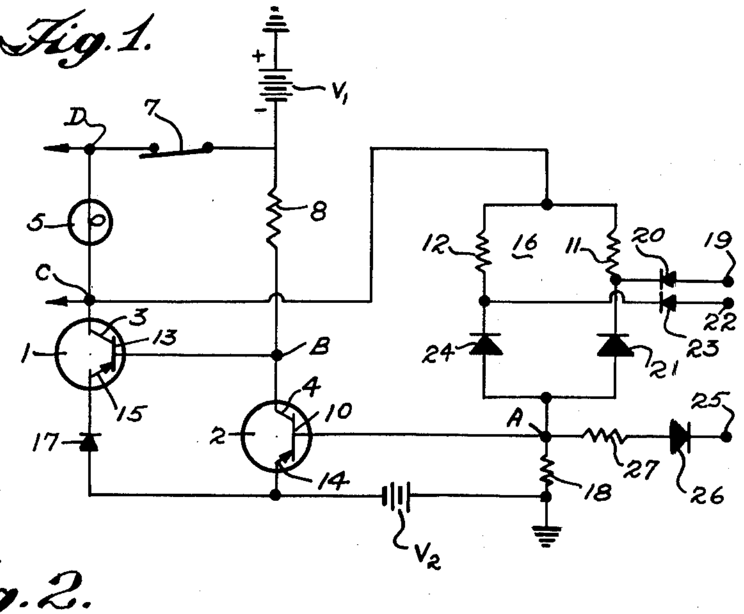
FIGURE 1 is a schematic diagram of an embodiment of this invention.
Figure 2:
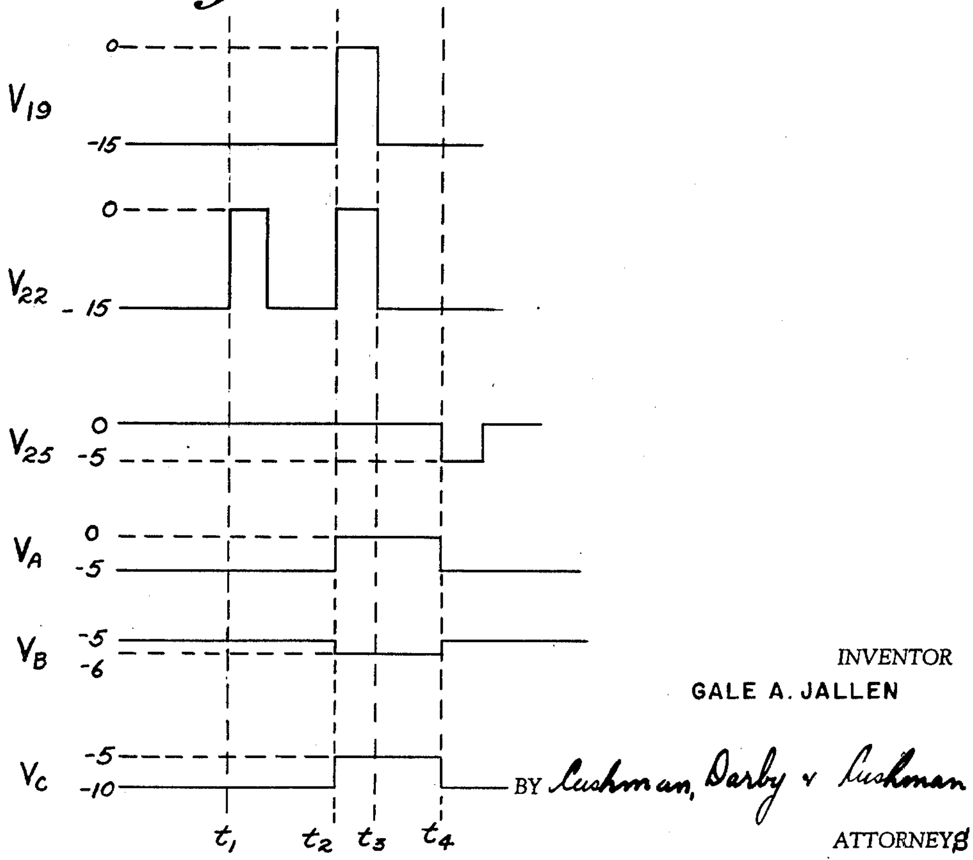
FIGURE 2 is a diagram of voltage levels at various points in the circuit.

The circuit of FIGURE 1 is a bistable circuit consisting of transistors 1 and 2 and associated electrical components, only one of these transistors being in a conductive, low impedance state at a given time. The information and control signals are fed into the circuit at input terminals 19, 22, and 25. As shown by FIGURE 2, these signals are always at one of two possible voltage levels. The potential at input terminals 19 and 22, $V_{19}$ and $V_{22}$, respectively, is either 0 volts or −15 volts. The positive 0 volts indicates the presence of a control or information signal and the negative voltages indicates no information signal present. These are typical values of voltage, and it should be understood that this invention is not limited thereto. In addition, the following description is based on the use of P-N-P type transistors. However, the invention herein described is operable with N-P-N types, provided proper voltage and diode polarities are used.

Referring to FIGURE 1, the collectors 3 and 4 of transistors 1 and 2 are connected through indicating light 5 and normally closed switch 7, and through resistor 8 respectively to the negative terminal of a battery or other voltage source $V_1$ providing −25 volts for example. Transistors 1 and 2 are cross coupled to one another each by a simple path, with collector 3 being coupled at junction A to base 10 through parallel resistors 11 and 12, and collector 4 being directly coupled at junction B to base 13. Emitters 14 and 15 are negatively biased by a common connection to a battery or similar voltage source $V_2$ of about −5 volts for example. Emitter 15 is made more negative than emitter 14 by diode 17 which is connected serially between emitter 15 and voltage $V_2$. Both voltage sources $V_1$ and $V_2$ are connected to a common reference potential, with ground being used as this reference potential in the preferred embodiment. This reference potential is also used as a common current return path. Resistor 18 is connected between parallel resistors 11 and 12 and the above-mentioned reference potential, forming a potential divider between the voltage at junction C and ground, and also to base 10. Two inputs 19 and 22 are logically ANDED at junction A, which is connected to the base of transistor 2, through diodes 21 and 24, respectively, with parallel resistors 11 and 12 being made part of the AND circuit. Thus diodes 21 and 24 are connected in series with resistors 11 and 12 respectively, the whole arrangement forming impedance network 16. Diodes 20 and 23 are serially connected to inputs 19 and 22, respectively, in opposite normal conduction direction to that of diodes 21 and 24. A third input 25 is connected through series diode 26 and series resistor 27 to junction A and thereby to base 10.

Assuming switch 7 is closed and voltage source $V_1$ has not yet been applied, neither of the transistors are conducting. Voltage $V_1$ is now applied. The base 10 of transistor 2 receives a negative bias due to current flowing from voltage $V_1$ through bias resistor 18, each branch of impedance network 16, and indicating lamp 5. The connection between voltage $V_1$ and bias resistor 18 is made through ground. The path just described will hereinafter be called the base 10 biasing circuit. Parallel resistors 11 and 12, and resistor 18 form a potential divider, the voltage across resistor 18 negatively biasing base 10. The value of this negative bias depends upon the values of resistors 11, 12, and 18 and as such may be varied by varying these resistor values. For proper operation, these values are made such that when transistor 1 is non-conducting, junction A and base 10 receive an operating voltage which makes them more negative than emitter 14. Collector 4 has voltage $V_1$ applied to it through resistor 8. Thus transistor 2 tends to start conducting. However, before it can conduct, transistor 1 becomes conductive due to the bias voltage $V_1$ which is immediately applied to the collector 3 and base 13 of transistor 1 through indicating lamp 5 and resistor 8, respectively. With transistor 1 conducting, point C becomes less negative than when transistor 1 was non-conducting. This causes less current to flow through the base 10 biasing circuit causing point A and base 10 to become less negative than the emitter 14 bias voltage. Therefore, transistor 2 remains non-conducting. With transistor 1 conducting, the current flowing through indicator light bulb 5 is of sufficient magnitude to cause it to glow. Transistor 1 will remain conducting until transistor 2 is forced into conduction by an external pulse.

Transistor 2 is forced into conduction by the application to base 10 of a negative pulse the value of which, when combined with the bias across resistor 18, is large enough to overcome the bias $V_2$ on emitter 14. With base 10 now more negative than emitter 14, and collector 4 having a negative voltage due to emitter-base current flow from transistor 1 through resistor 8, transistor 2 conducts. Point B becomes less negative remaining just slightly more negative than emitter 14. Due to the voltage drop across diode 17, emitter 15 is now more negative than base 13 which is directly coupled to point B and collector 4. Since emitter 15 is more negative than base 13, transistor 1 becomes non-conductive. Point C becomes more negative causing a larger current to flow through the aforementioned base 10 biasing circuit. The voltage at point A becomes more negative and, due to the predetermined values of resistors 11, 12, and 18, is of sufficient magnitude to supply an operating voltage to base 10 making it more negative than emitter 14, thereby causing transistor 2 to conduct to virtual saturation. Transistor 2 will now be maintained in a conducting state with the original negative pulse removed from its base. With transistor 2 conducting, current is still flowing through indicating lamp 5. However, since transistor 1 is no longer conducting, the only current path existing for this flow is through the base 10 biasing circuit. This current is not large enough to make lamp 5 glow. Thus lamp 5 glows only when transistor 1 is conducting and transistor 2 is non-conducting. For reasons which will hereinafter become clear, this is the abnormal operation state of the circuit.

The foregoing discussion has described the operation of the bistable holding circuit neglecting any voltage at input terminals 19, 22, and 25.

The operation of this invention with input voltages applied to terminals 19, 22, and 25 will next be discussed.

The voltage values as shown in FIGURE 2, and hereinafter set forth are typical ones, and it should be understood that this invention is not limited thereto. Circuit design techniques can be utilized to determine proper voltage values, depending upon the value and type of circuit components.

The two inputs 19 and 22 are logically ANDED at junction A as previously indicated. The main purpose of the third input 25 is to pulse base 10 of transistor 2 negatively when transistor 1 is conducting so as to force transistor 2 into conduction and thereby cause transistor 1 to stop conducting. Input 25 may be considered as an extension of the above-mentioned AND circuit, although it is not necessary to the circuit operation to so do. With transistor 2 conducting and transistor 1 non-conducting, base 10 cannot become less negative than the voltage supplied by the previously described base 10 biasing circuit, until all three input voltages $V_{19}$, $V_{22}$, and $V_{25}$ become less negative. For example, assuming $V_{25}$ is 0 volts, $V_{19}$ is −15 volts, and $V_{22}$ is 0 volts, such as shown at time $t_1$ in FIGURE 2. The operating voltage sufficient to hold transistor 2 in the conducting state, is still maintained at junction A and the base of transistor 2, by current flowing from $V_1$ via ground through resistor 18, diode 21 and resistor 11, lamp 5 and switch 7. Diode 23 is biased in the forward conducting direction by $V_{22}$ thereby putting 0 volts, neglecting a small voltage drop across diode 23, at the junction of resistor 12, diodes 23 and 24. This voltage biases diode 24 in the reverse conduction direction thereby blocking current flow through diode 24. In the same manner, diode 26 is in the non-conducting state, since it is also reverse biased. Any other combination of input voltages, as long as one of the inputs remains sufficiently negative to maintain transistor 2 in the conductive state, will not cause the circuit of FIGURE 1 to change states.

In order to change the circuit to its other stable state in which transistor 2 is cutoff and transistor 1 conducts, transistor 2 is forced into the non-conducting state by causing its base voltage to become less negative than its emitter voltage. When all three inputs become less negative, for example 0 volts as shown at time $t_2$ in FIGURE 2, diodes 21, 24, and 26 are cutoff by being reverse biased. Current normally flowing through the base 10 bias circuit is blocked and the potential at junction A and at the base element of transistor 2 goes towards the zero ground potential through resistor 18. With the base operating voltage removed, the emitter-to-base back bias of $V_2$ cuts off transistor 2. Since no collector current will flow through resistor 8, the voltage at junction B will start increasing negatively to voltage $V_1$. Since junction B is connected to the base element of transistor 1, this transistor will start conducting as soon as junction B becomes more negative than the emitter-to-base back bias on transistor 1, which is supplied by voltage $V_2$ through diode 17. FIGURE 2 shows the voltage at junction B to be −6 volts. With transistor 1 in a conductive state, the current flow from potential source $V_1$ will flow through ground, battery $V_2$, diode 17, emitter 15, collector 3, and normally closed switch 7. The low impedence of transistor 1 in the conductive state, as compared to the impedence of the voltage divider network including resistors 11, 12, and 18, results in an increase of current flow through light 5 of a magnitude to put it in the glowing state. With transistor 1 in the conductive state, the voltage at junction C becomes less negative than when light 5 was in the non-incandescent state. Therefore, although inputs $V_{19}$ and/or $V_{22}$ return to a more negative potential, as shown at time $t_3$ in FIGURE 2, diodes 20 and/or 23 are cutoff and the voltage at junction A, $V_A$, as supplied through the previously described voltage divider network, remains at a value less negative than the emitter-to-base back bias of transistor 2. This keeps transistor 2 in the non-conductive state. For exemplary reasons, FIGURE 2 shows the voltage $V_A$ remaining at 0 volts at time $t_3$. In actual practice, the voltage at junction A, $V_A$, does go slightly more negative when $V_{19}$ and/or $V_{22}$ return to a negative value. The circuit of FIGURE 1 with transistor 1 conducting as a result of the two coincident pulses to terminals 19, 22 while the input at terminal 25 remains at its normal zero value, is then in its second bistable state and remains so regardless of any voltage changes at inputs 19 or 22.

In order to return the circuit to its initial state, i.e., transistor 2 conducting and transistor 1 cut-off, a negative potential is applied to junction A from input 25 through diode 26 and current limiting resistor 27. This is exemplified in FIGURE 2 by showing $V_{25}$ going to −5 volts at time $t_4$. The negative potential thereby applied to the base 10 of transistor 2 will cause it to conduct, and, as previously described, this results in transistor 1 being cutoff and light 5 extinguished, returning the circuit to its previous state.

In accordance with the preceding detailed description of circuit operation of this invention, the following is a description of how the invention may be utilized.

Assume input 19 is an information input, input 22 is a timing control input and input 25 is a reset input. The voltages at inputs 19 and 22 are normally of some negative value and the voltage at input 25 is normally 0 volts or some slightly positive value. Transistor 2 is normally conducting so that transistor 1 is cutoff and light 5 is not glowing. A positive control signal, of sufficient magnitude, is fed into input 22. The combination of voltages $V_{22}$ and $V_{25}$ gates the circuit so that a positive going information pulse on input 19 will enable the circuit to switch to its other stable state. The presence of information at input 19 is in the form of a positive going pulse so that the negative logical AND input causes junction A to become less negative by blocking current flowing through the base 10 biasing circuit during the existance of the positive going pulse thereby switching the circuit so that transistor 2 is cutoff, transistor 1 is conducting and light 5 is in the incandescent state. To return the circuit to its previous state, a negative voltage is fed into input 25. This resets the circuit so that it is ready to receive subsequent information. Therefore, as described, an electrical pulse of information has been transformed into a visual indication, under control of another electrical pulse, and this indication will be retained even after the information pulse has subsided.

The function of normally closed switch 7 is to provide a means of quickly checking the circuit operation. By opening the switch, when there is no negative potential applied to input 25, the base 10 operating voltage is removed, thereby forcing transistor 2 into the cutoff state. As previously described, since no collector current will flow in transistor 2, the voltage at junction B will rise negatively toward voltage $V_1$ until the negative voltage applied to the base element 13 of transistor 1 overcomes the emitter-to-base back bias on transistor 1. Since switch 7 is open, no potential is applied to the collector of transistor 1 and no collector current will flow. However, by closing switch 7, a collector potential will be applied to transistor 1 through light 5. Since this transistor is in the conducting state because of the negative base potential, collector current will flow and light 5 will glow and remain in this state until a negative reset voltage is applied to input 25. In this manner, the circuit has been forced into the state wherein the light is glowing. Failure of the light to become incandescent or failure to remain so until a reset signal is applied, indicates a circuit malfunction. If a multiplicity of circuits is to be used, which is the normal practice, junction D would be connected to the same point in all of the circuits so that all the circuits can be checked for malfunctions by the use of a single switch 7.

An advantage of this invention, independent of the testing capabilities using switch 7, is that any collector-to-base reverse leakage current will not cause improper operation of the circuit. Previous circuits utilized two transistors which were both in the conductive state or non-conductive state simultaneously. With both transistors off, collector-to-base reverse leakage current in one transistor would be fed back to and amplified by the other transistor which could result in causing both transistors to conduct. Therefore, it was necessary to select low leakage transistors and, since leakage current is proportional to temperature, circuit instability resulted from fluctuating temperatures. In this invention, collector-to-base reverse current leakage from the non-conducting transistor will not affect the other transistor since it is already in the conducting state. Therefore, a wide range of leakage current characteristics is achieved and the circuit is less susceptible to temperature variations.

Thus, it is apparent that there is provided by this invention a circuit in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A bistable circuit comprising two active elements cross coupled one to another and commonly coupled to a source of potential, a potential divider including the cross coupling from one element to the other, said divider being coupled to said source for providing an operating voltage to said other element when said one element is not conducting, said operating voltage being developed by current from said source through said divider, and means coupled to said divider for at least momentarily blocking the current therethrough and removing said operating voltage to cause said other element to assume its non-conductive state which in turn causes said one element to become and then remain conductive.

2. A circuit as in claim 1 wherein the blocking means includes gating means responsive to at least one external signal for inhibiting the flow of said current during the existence of said signal.

3. A circuit as in claim 1 wherein the cross coupling from said other element to said one element is direct and dissimilar to the potential divider cross coupling from said one to the other element.

4. A circuit comprising bistable means having two active elements and including biasing means for applying an operating voltage to one of the active elements, said operating voltage being present due to current unable to pass through the other element and effective to cause said one element to conduct when the other element is non-conducting, inhibiting means responsive to at least one external signal for at least momentarily blocking said current and removing said operating voltage from said one element to cause that element to stop conducting which in turn causes the other element to start and then remain conducting, and means for returning said one active element to its conductive state and said other active element to its non-conductive state.

5. A circuit as in claim 4 wherein the two active elements are transistors.

6. A circuit as in claim 5 wherein each of said transistors have collector, base, and emitter electrodes and each has its collector electrode cross coupled to the base of the other by respective dissimilar D.C. paths one of which at least partially includes said inhibiting means, said emitter electrodes being at different potentials.

7. A circuit as in claim 5 wherein the transistors are of the P-N-P type.

8. A circuit as in claim 4 wherein said elements are dissimilarly cross coupled one to another each by a single path with said inhibiting means being at least partially in one of said single cross coupling paths.

9. A circuit comprising bistable means having two active elements dissimilarly cross coupled one to another each by a single path to cause the circuit to exhibit two stable states and including two load devises respectively coupled to said elements and commonly to a source of potential, inhibiting means at least partially in one of said single paths and operative in response to at least one external signal for blocking current flow during the existence of said signal from said potential source through the load devise associated with one active element to the other active element, the arrangement being such that when said other element is conducting, the blocking of said current flow forces that element into a non-conductive state which in turn causes the said one active element to go into a conductive state, and means coupled to the said other element for causing that element to return to its conductive state which in turn causes the said one element to return to its non-conductive state.

10. A circuit as in claim 9, wherein said inhibiting means comprises an input terminal for receiving said signal, a first diode connected in series with the input terminal in a direction such that said first diode will conduct when said signal is applied to said input terminal, the input terminal and the first diode being connected to the cross coupling from the said one element and a second diode connected in series with the last mentioned cross coupling in a direction such that said second diode will not conduct when said signal is applied on said input terminal, thereby blocking said current flow.

11. A circuit as in claim 9 wherein said inhibiting means is operative to block said current flow only in response to a plurality of coincident external signals and comprises an AND circuit for receiving said coincident signals.

12. A circuit as in claim 9, wherein said means for causing said other element to return to its conductive state comprises an input terminal coupled to said other active element through a series diode and resistor.

13. A circuit as in claim 9 wherein the said load device asociated with the said other active element is a resistor and wherein the said one active element is biased by a voltage supplied from said potential source through the said load resistor, and the said other active element is biased by a voltage supplied from said potential source through the load device associated with said one active element and said inhibiting means, and further including a switch between the load device associated with said one active element and said potential source, the arrangement being such, due at least partially to said dissimilar cross couplings, that when said switch is opened, both active elements are forced into a non-conductive state, and when said switch is closed said one active element always becomes conductive while said other active element always remains in a non-conductive state.

14. A bistable circuit comprising a first transistor and a second transistor cross coupled one to another to cause the circuit to exhibit two stable states, said cross coupling comprising a resistance network in one branch, and direct coupling in the other, a different load impedance for each transistor, a first voltage source commonly connected to the collector of each transistor through its respective load impedance, a second voltage source connected directly to the emitter of said second transistor, a diode coupling said second voltage source to the emitter of said first transistor, said diode providing the additional voltage drop necessary to keep said first transistor non-conducting while said second transistor is conducting, and a biasing resistor connected between said resistance network and a reference potential and to the base of said second transistor for biasing the base of said second transistor.

15. A circuit comprising a first and a second transistor each having a collector, a base, and an emitter, the base of the first transistor being directly coupled to the collector of the second transistor, a two branch parallel resistance network, said resistance network being connected between the collector of the first transistor and the base of the second transistor, a different load impedance for each transistor, a first voltage source commonly connected to the collector of each transistor through its respective load impedance, a second voltage source connected directly to the emitter of the second transistor, a diode coupling said second voltage source to the emitter of the first transistor, said diode providing an additional voltage to cause the first transistor to be non-conducting while said second transistor is conducting, a biasing resistor connected between said resistance network and a reference potential and to the base of the second transistor for biasing the base of the second transistor, an AND circuit including said resistance network and having two input terminals and respectively associated diodes, an additional diode connected in series with each of said input terminals in opposite conduction direction to that of said associated diodes, a third input terminal, another diode, and a resistor serially connected to the base of the second transistor to cause said second transistor to conduct in response to a signal applied to said third terminal.

16. A circuit as in claim 15 wherein the load impedance for the first transistor is at least one light bulb coupled to said first voltage source by a normally closed switch by which operation of said circuit may be checked, the arrangement being such that said light bulb glows only when said first transistor is conducting which is invariably the case upon reclosure of said switch.

References Cited in the file of this patent

UNITED STATES PATENTS

| | | |
|---|---|---|
| 2,775,697 | Madey | Dec. 25, 1956 |
| 2,894,215 | Toy | July 7, 1959 |
| 2,898,479 | McElroy | Aug. 4, 1959 |
| 2,901,639 | Woll | Aug. 25, 1959 |
| 2,901,669 | Coleman | Aug. 25, 1959 |
| 2,916,637 | Wanlass | Dec. 8, 1959 |
| 2,944,164 | Odell et al. | July 5, 1960 |
| 2,965,767 | Wanlass | Dec. 20, 1960 |
| 2,965,768 | Wanlass | Dec. 20, 1960 |
| 2,986,649 | Wray | May 30, 1961 |
| 3,021,435 | Keiper | Feb. 13, 1962 |

UNITED STATES PATENT OFFICE

CERTIFICATE OF CORRECTION

Patent No. 3,127,523 March 31, 1964

Gale A. Jallen

It is hereby certified that error appears in the above numbered patent requiring correction and that the said Letters Patent should read as corrected below.

Column 7, line 4, for "devises" read -- devices --; line 10, for "devise" read -- device --.

Signed and sealed this 8th day of September 1964.

(SEAL)
Attest:

ERNEST W. SWIDER
Attesting Officer

EDWARD J. BRENNER
Commissioner of Patents